J. A. Davis,
Steam-Boiler Water-Feeder.
N°83,608.    Patented Nov. 3, 1868.
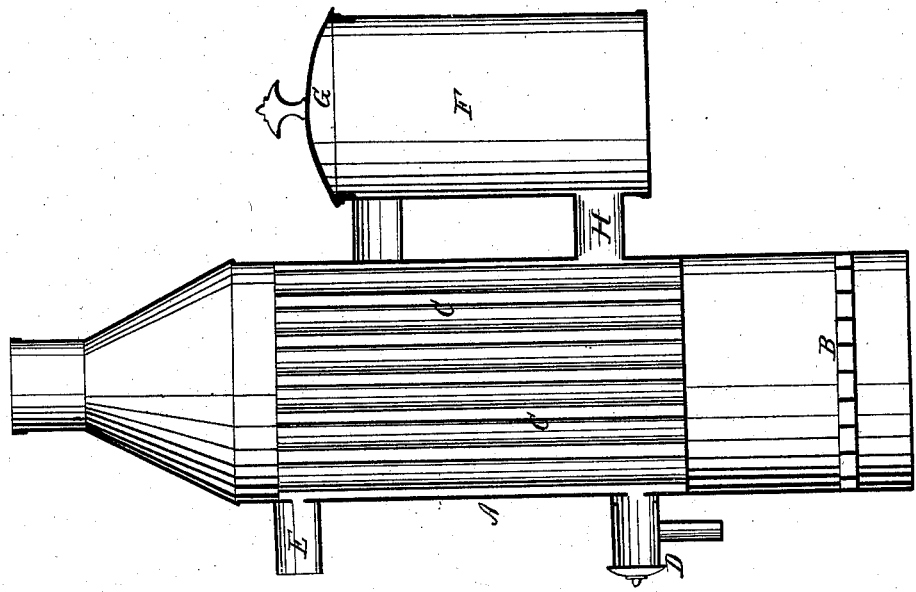
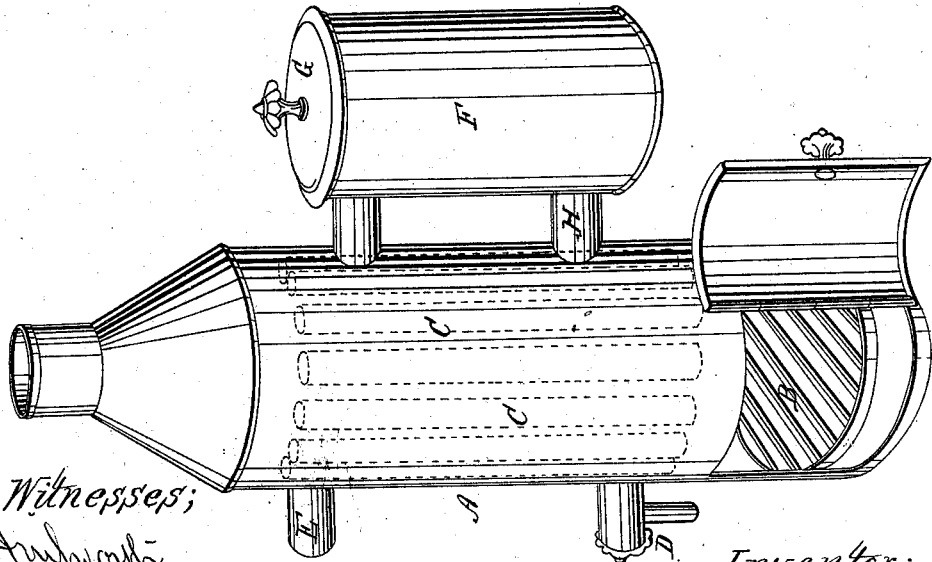

JOB A. DAVIS, OF WATERTOWN, NEW YORK.

Letters Patent No. 83,608, dated November 3, 1868.

IMPROVEMENT IN STEAM-GENERATORS.

The Schedule referred to in these Letters Patent and making part of the same.

*To all whom it may concern:*

Be it known that I, JOB A. DAVIS, of Watertown, in the county of Jefferson, and State of New York, have invented certain new and useful Improvements in Steam-Generating Apparatus; and I do hereby declare that the following is a full, clear, and exact description thereof, and of its mode or manner of operation, reference being had to the accompanying drawings, and to the letters of reference marked thereon, and making a part of this specification.

It is often very desirable, and particularly for the purpose of cooking by steam, to generate steam from a small quantity of water, and by means of but little fire, or from the burning of a simple lamp. It is, of course, an easy matter to generate steam by the use or combustion of a little fuel, provided a proportionate small quantity of water is subjected to the heat generated; but with such a small body of water that it can be quickly converted into steam with a little fire, a fresh supply of water has often to be furnished, and this replenishing of the water necessarily reduces the temperature of the steam-generator, and a new consumption of fuel is again required to raise the water to the boiling-point.

My invention consists in a cheap, simple, and effective apparatus, by which a very small body of water may be subjected to the direct action of any fire or lamp, and steam be thus produced quickly, and at but little expense, and by which, also, a constant supply of water is furnished to the steam-generator, but without reducing the temperature of the boiler, or interrupting the generation of the steam materially.

Figure 1 is a perspective view of my improved steam-generator.

Figure 2 is a vertical section of the same.

The cylinder A is a thin iron or tin portable vessel, having a fire-grate, B, in its lower end, and having heating-flues, C, extending up through the water-chamber.

Near its bottom are fixed a tube and stop-cock, D, for drawing off the water when desired, and from the top the steam is conducted by a pipe, E, for use in cooking, or for other purposes.

In such vessel, A, the fire-surface is large, compared with the water-surface, so as to secure a rapid generation of steam from the combustion of but little fuel, or even by the use of an ordinary lamp or gas-jet.

Such vessel can be made of light metal, since, for ordinary purposes, as cooking, heating rooms, &c., the steam need not be retained therein under pressure, but passes off freely through the pipe E.

Connecting with such steam-generating vessel A is a water-vessel, F, which is open at the top, to permit water to be easily poured therein, and covered with a loose top, G, and which communicates with the vessel A by means of and through the pipe H.

It being a natural law of fluids, that they will rise to or be at the same level, in vessels connecting with each other, whatever their relative capacity and shape, the water in the steam-generator A and in the reservoir F will always be at the same height, and a supply from F will flow into A just as fast as, and only as fast as the water in A is converted into steam and passes off. And as this supply is continual, and not in large, but in small quantities, there will not be any sensible reduction of the temperature by reason of such supply, nor any intermission or cessation in the generation of the steam.

The supply-reservoir E may be of any convenient size, and so proportioned to the steam-generator A as to supply the latter for a given length of time, without such reservoir requiring to be filled.

For cooking-purposes, particularly in warm weather, this apparatus will be found not only convenient, but very economical in its operation, and it can also be applied to very many uses where steam is desired and but little pressure required.

What I claim as my invention, and desire to secure by Letters Patent, is—

The combination of the generator A and the water-supply reservoir F, whereby to generate low pressure of steam, and to supply heated water to the boiler, substantially as herein set forth.

JOB A. DAVIS.

Witnesses:
L. H. AINSWORTH,
JOHN H. NAPIER.